United States Patent [19]

Kroeber

[11] 4,101,030
[45] Jul. 18, 1978

[54] CASSETTE

[76] Inventor: Wilhelm Kroeber, 3 Ellerbookwisch, Hamburg 2000, Fed. Rep. of Germany. 65

[21] Appl. No.: 803,066

[22] Filed: Jun. 3, 1977

[30] Foreign Application Priority Data

Jun. 3, 1976 [DE] Fed. Rep. of Germany ....... 2624880

[51] Int. Cl.² .......................................... B65D 85/672
[52] U.S. Cl. ................... 206/398; 206/387; 206/403
[58] Field of Search ............... 206/303, 387, 398, 400, 206/401, 402, 406, 413, 414, 403, 444; 242/137, 138

[56] References Cited

U.S. PATENT DOCUMENTS

| 2,045,652 | 6/1936 | Hopkins | 206/398 |
| 2,151,025 | 3/1939 | Goldberg | 206/403 |
| 3,231,081 | 1/1966 | Elterman | 206/398 |
| 3,339,718 | 9/1967 | Geier | 206/406 |

FOREIGN PATENT DOCUMENTS

| 707,978 | 4/1965 | Canada | 206/403 |
| 1,045,201 | 10/1966 | United Kingdom | 206/402 |

Primary Examiner—William Price
Assistant Examiner—Bruce H. Bernstein
Attorney, Agent, or Firm—Andrus, Sceales, Starke & Sawall

[57] ABSTRACT

A cassette and associated spool for film, sound track and like material, with means for supporting the outer areas of the spool flanges to prevent sagging and warping of the spool flanges. The support means comprises interengaging formations on the cassette and on the spool. The interengaging formations may include projections on one of the cassette and the spool and recesses on the other of the cassette and the spool. Alternatively, the formations may comprise resiliently and radially displaceable areas of the cassette side wall which locate between the spool flanges when the cassette lid is fitted to the cassette base.

5 Claims, 17 Drawing Figures

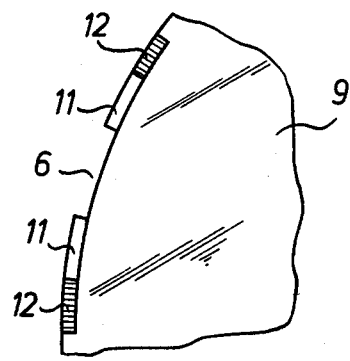
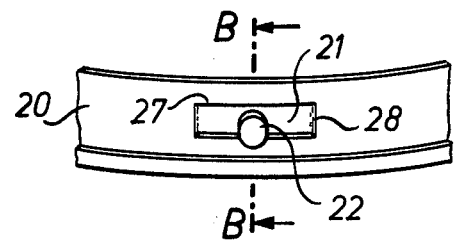
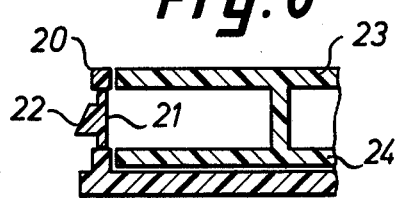
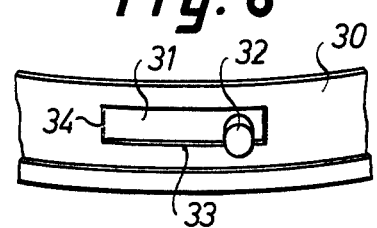
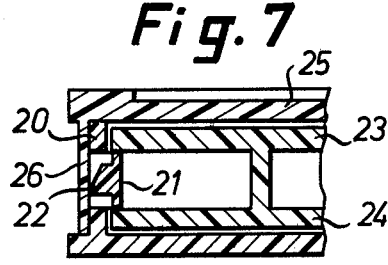
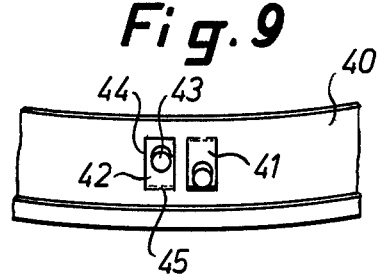
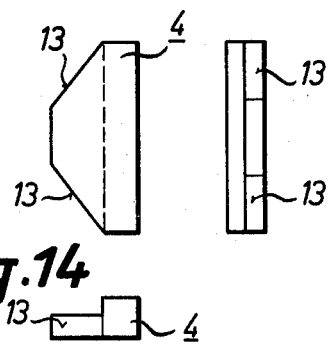
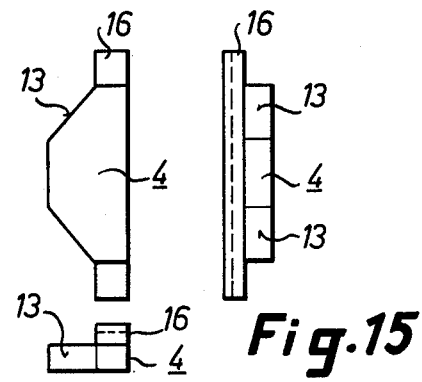

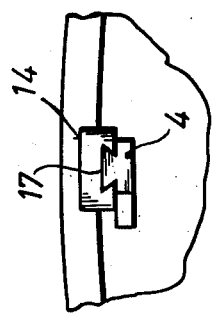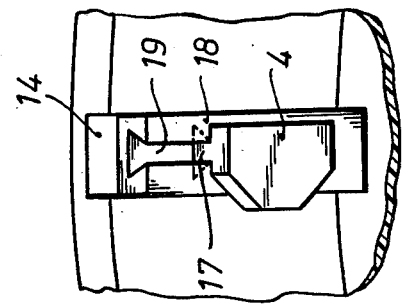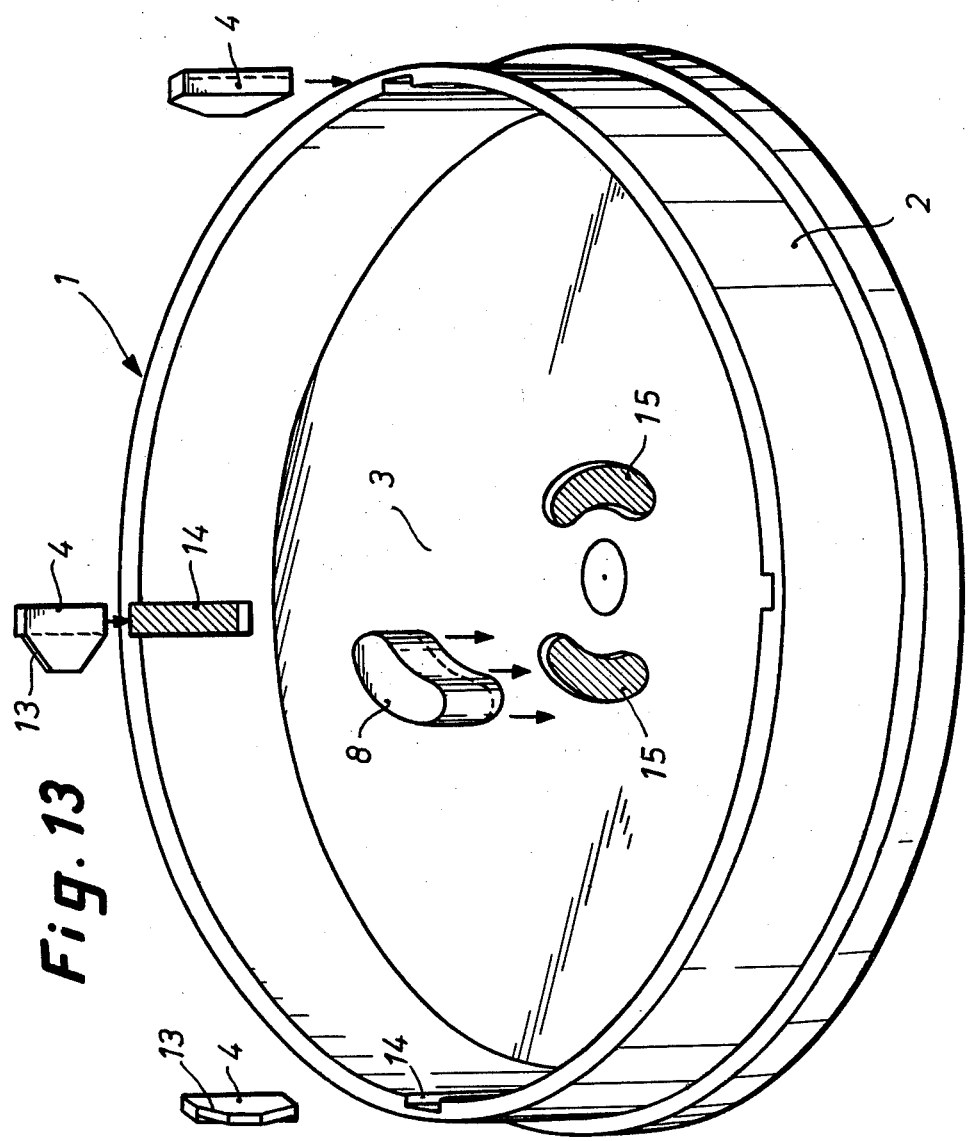

CASSETTE

BACKGROUND OF THE INVENTION

1. Field of the Invention

This invention relates to a cassette and associated spool for film, sound track and like material, with means for the mutual support of the outer areas of the spool flanges.

2. Description of the Prior Art

If a spool of this type is placed in the casette in an empty or only partially filled condition, the area of the uppermost flange of the spool projecting beyond the core of the spool is not supported, so that it sags out of its normal position to a greater or lesser degree, depending on the thickness of the flange. This phenomenon becomes particularly noticeable after considerable use of the spools, if the material used, today almost exclusively plastics, exhibits signs of fatigue. This sagging of the upper spool flange leads in time to permanent warping of the spool so that even when fully supported the flange no longer assumes its original shape. The result of this is that the film running off drags on the outer areas of the inner sides of the flanges and is thus subject to damage. In any event, free running-off of the film with spools distorted in this manner is no longer ensured.

In order to overcome the above-mentioned disadvantage it has already been suggested when transporting empty and/or partially filled spools to insert cardboard strips between the outer areas of the upper and lower flanges, the height of such strips corresponding to the flange separation. Cardboard strips of this kind are placed by hand around the spool core and fastened together. It is quite obvious that such a procedure is extremely work-intensive and correspondingly time-consuming and expensive. Furthermore, it has the disadvantage that, when removing the spool from the cassette, the inserted cardboard strip must first be removed before the spool can be put to use. If the spool has then to be stored empty for a lengthy period, it must once more be provided with a cardboard strip. However, in the overwhelming majority of cases this will not happen as the user will not take the trouble himself to place a cardboard strip in the spool in the way the manufacturer did. The result of this is that, in spite of the measures provided by the manufacturer, distortion of the spool will occur after a certain period of use.

SUMMARY OF THE PRESENT INVENTION

The principal object of this invention is to avoid the above-mentioned disadvantages and to provide means for supporting the outer areas of the spool flanges which, on the one hand, is cheap for the manufacturer to produce and, on the other hand, makes additional effort and application of material by the user superfluous.

This task is solved, according to the invention, by providing a casette and associated spool for film, sound track and like material, with means for supporting the outer areas of the spool flanges comprising a plurality of projections, provided around the inner side of the side wall of the base of the cassette, the height of which corresponds substantially to the spacing between adjacent faces of the spool flanges of the spool introduced into the cassette, each spool flange having in its outer edge a number of recesses corresponding to the number of projections, the depth and width of the recesses at least corresponding to the thickness and width, of the projections.

The construction provided by the invention exhibits considerable advantages over the known means for supporting the outer areas of the spool flanges. Of great significance is the fact that, in the construction according to the invention, an additional device, for example the above-mentioned cardboard strip, is redundant; the same result is achieved by a special formation on the side wall of the base of the cassette in combination with the spool. This has the great advantage for the manufacturer that the additional work involved in the insertion of a separate device, for example a cardboard strip, is obviated and also that no additional material is required. For the user there is the advantage that each time he loads the spool into the cassette, the means for supporting the outer areas of the spool flanges is at his disposal without him having to make special provisions for this. In this manner warping of the spools is avoided, even after lengthy use, and their life span is considerably enhanced.

In the arrangement proposed by the invention, support for the outer flange areas of the spool is readily and simply provided. The spool is inserted in the cassette in such a manner that the projections on the side wall of the cassette base engage in the corresponding recesses in the edges of the spool flanges. With the spool deposited on the bottom wall the spool is then rotated until the projections have left the recesses and have penetrated between the spool flanges. As the height of the projections corresponds substantially to the spacing between adjacent faces of the spool flanges, support of the outer flange areas of the spool is, in this way, achieved at points spaced about the periphery of the spool.

The width of the recesses should be such that, on the one hand, the spool can be placed in the cassette with ease and, on the other hand, not too great a rotation is necessary to push the protruding areas between the spool flanges. As a basis for calculation, the recesses should be of about three times the width of the projections. The height of the projections could correspond substantially to the spacing between adjacent faces of the spool flanges, although slight deviations either way may be advantageous. However, as an upper limit, a height should be considered for which the projections can be pushed between the spool flanges without application of excessive force, and as a lower limited, a height which still ensures positive support of the spool flanges. Furthermore, the depth of the recesses should be matched to the thickness of the projections. In this, generally, the depth can be somewhat less than the thickness of the projection, as the edges of the spool flanges do not quite reach the side wall of the base.

It has presently been shown, that with spools of this type, formed according to the invention, sagging and warping of the upper flange can occur if, for example, the spools are left empty out of their cassettes and are exposed for a considerable time to intensive sunlight. These spools, naturally can only be reinserted into their cassettes with difficulty because of the distorted upper flange. In order to remove this disadvantage, a further preferred embodiment is proposed, in which the upper and lower sides of the projections of the side wall of the base of the cassette are chamfered at least towards one of their side walls. In this manner, the upper as well as the lower flange, if the spool is placed in the cassette inverted, can slide along the chamfered projections into its correct position, without the flange catching on the projections in any manner.

In order to enable cassettes formed according to the invention to be used with normal spools, i.e. formed without recesses, it is further proposed that the projections on the side wall of the cassette base be formed as elements for removable insertion into vertical recesses on the inner side of the side wall of the base. Furthermore, such insertable elements can also be used with spools of lesser diameter than the casette. For this purpose the insertable elements include a cross-piece which is insertable into the recesses, the cross-piece being of thickness greater than the depth of the recesses and of length corresponding to the height of the side wall of the base. Then, with the elements and spool in position, the edges of the spool flanges abut against the cross-pieces, so that after the usual rotation of the spool the flanges are supported by the elements.

In a further embodiment the front sides of the cross-pieces of the insertable elements are provided with groves into which separate elements having projections can be slotted. This embodiment of the invention enables slotting of the elements having projections into the cross-pieces as well as slotting of the cross-pieces into the side wall of the base and thus provides a high degree of adaptability.

The embodiments in which insertable elements are employed have the advantage of interchangeability of the elements with the result that a single casette can be employed for a variety of spool sizes.

In order to provide a stop to limit rotational movement when engaging the projections between the spool flanges, the base of the cassette is, in a preferred embodiment of the invention, preferably provided with at least one protuberance and the spool with at least one recess for cooperation therewith, so that the spool placed in the cassette is freely rotatable through a limited angle until the edges of the recess abut against the edges of the protuberance.

It is obvious that the angle through which the spool can be rotated is so selected that the projections of the side wall of the cassette engage between the spool flanges at the end of the rotation of the spool. The spool can now no longer be rotated in this direction so that, with this embodiment, together with support of the outer areas of the spool flange, a degree of retention of the spool in the casette on its being transported is achieved. This has the advantage, particularly on opening the lid of the cassette, that the spool cannot fall out of the cassette and thus, in the event of the spool being only partly filled with film, a so-called "film salad" is avoided. On the other hand, the spool can be removed from the cassette by a slight rotation in the opposite direction.

This additional retaining effect also naturally occurs with the embodiment already described in which no stops for limiting rotation are provided. There also, the spool cannot simply fall out of the cassette once the projections of the side wall of the cassette base are engaged between the spool flanges. However, when no stops are provided, the spool can, perhaps in transport, rotate to a position where the projections assume the same position as the recesses of the edge areas of the spool flanges. In the event of this happening, the intended supporting effect is naturally not present and the spool can fall out of the cassette.

With a further preferred embodiment of the invention, this additional retaining effect occurs to an enhanced degree. In this embodiment, the height of the projections is slightly greater than the distance between adjacent sides of the spool flanges and the inner sides of the spool flanges adjacent the recesses are provided with guide grooves terminating in depressions with which the projections engage. On rotating the spool in the cassette, the projections of the side wall of the cassette base slide along the guide grooves, producing a slight prestress in the flanges as the depth of the guide grooves combined with the inside flange spacing of the spool does not quite correspond with the height of the projections in the side wall of the base of the cassette. Finally, the projections engage in the depressions provided for them at the ends of the guide grooves. In this manner the spool is positively retained inside the cassette, so that falling out of the same from the cassette is impossible. On removing the spool, this is rotated back with slight application of force until the projections have again reached the recesses in the spool flanges.

It is obvious that the last described retention means can also be utilized in the previously described embodiment although a corresponding adjustment must be undertaken. With this embodiment are then two separate systems of stops available.

According to a further independent solution proposal, the inner side of the side wall of the cassette base is provided with recesses which include vertical portions which extend from adjacent the lower edge to the upper edge of the side wall and horizontal portions arranged at the spacing of the spool flanges and having the same width as the thickness of the flanges, the spool flanges being provided with a corresponding number of projections whose depth and width correspond to the vertical recesses.

In this embodiment, as compared with the proposals described previously, essentially only the arrangements of the protruding areas and recesses are exchanged, i.e. the recesses, naturally in a correspondingly modified shape, are arranged on the inner side of the side wall of the base. It is obvious that the special embodiments enumerated in connection with the first named proposal also can find use here if they are basically suitable. This latter proposal has the advantage, in any event, that normal spools not having projections may also be inserted in casettes formed in such a manner.

In order to facilitate insertion of the spool into the casette, the upper side of the spool and the base of the casette may be provided with graphic markings at the points of relevant projections and recesses according to a further development of the present proposal.

The basic task of the invention is solved according to a further proposal independent from the foregoing named solution in that areas of the side wall of the cassette base, of height approxiamtely equal to the inner spacing of the spool flanges, are arranged to be resiliently and radially displaceable in relation to the other wall areas and are provided with protruding areas on their outer sides so that they can be pressed into the inside of the cassette between the spool flanges by application of the cassette lid to the base of the cassette.

This embodiment is particularly simple and quick to operate. By the mere application of the cassette lid, the resilient and displaceable wall areas of the side wall of the base are pressed between and thereby support the spool flanges. On opening of the cassette the resilient wall areas move outward to their original positions, thus releasing the spool which can then be removed from the cassette. This embodiment has the disadvantage as against the previous proposals that, with the cassette lid removed, the spool is no longer retained so that it can easily fall out of the cassette. On the other hand, rotation of the spool is not required.

In order to improve the displaceability and elasticity of the resilient wall areas, these preferably have a lesser thickness than the remainder of the side wall of the base.

In a further embodiment of the invention, the resilient and displaceable wall areas are formed by tongues cut in the side wall of the base, at the moveable end portions of which the protruding areas are arranged. Thus, the resilient and displaceable wall areas are preferably formed by tongues extending in a horizontal direction. They can, however, also be formed of two tongues extending vertically with oppositely arranged free ends. A similar favourable effect is achieved with an embodiment in which the resiliently positioned wall areas are formed of strips secured to the wall at each end.

In order to facilitate the application of the lid to the base so that the lid can slide over the protruding areas of the resilient wall areas, the protruding areas are preferrably chamfered.

BRIEF DESCRIPTION OF THE DRAWINGS

Various embodiments of the invention will now be described, by way of example, with reference to the accompanying drawings, in which:

FIG. 4 is a plan view of a part of the underside of an upper flange of a spool according to the invention, FIG. 5 shows a perspective view of part of the side wall of the base of a further embodiment of the invention, FIG. 6 shows a section along the line B—B in FIG. 5, FIG. 7 shows a section similar to that of FIG. 6 but with the lid applied, FIG. 8 is a perspective view of a part of a side wall of the base of a further embodiment of the invention, FIG. 9 shows a perspective view of part of a side wall of the base of another embodiment of the invention, FIG. 13 is a perspective view of the base of a cassette according to a further embodiment of the invention, FIG. 14 shows the front, side and plan of a first embodiment of an insertable element, FIG. 15 shows the front, side and plan of a second embodiment of an insertable element, FIG. 16 is a perspective view of a third embodiment of an insertable element, and FIG. 17 shows a plan view of the element shown in FIG. 16.

DETAILED DESCRIPTION OF THE PREFERRED EMBODIMENT

Figure 1:
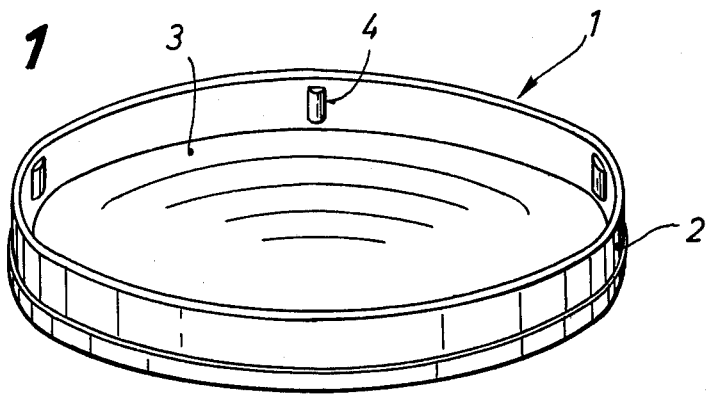
FIG. 1 shows a perspective view of the base of a cassette formed according to the invention.

Referring to FIG. 1, the base 1 of a first embodiment of a cassette formed according to the invention is identified. The base 1 is provided with a side wall 2 and a bottom wall 3. Spaced around the inner side of the side wall 2 are projections 4, whose height corresponds approximately to the spacing between adjacent faces of the flanges of a spool to be inserted in the cassette. The shape of the projections is of no consequence for the invention; it has only to be ensured that sufficient supporting effect is achieved for the spool flanges. In the embodiment shown here, four projections are arranged on the inner side of the side wall of the base, although this number can be increased or decreased according to the requirements demanded. Practical considerations, however, indicate that four is the most suitable number.

Figures 2, 12:
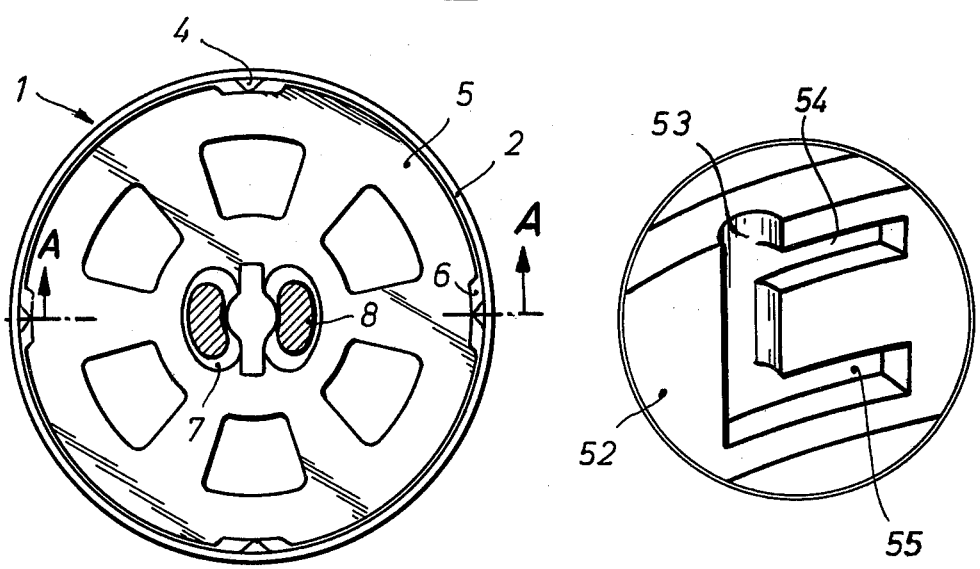
FIG. 2 is a plan view of the cassette base of FIG. 1 with a spool inserted.
FIG. 12 shows a section A of FIG. 10.

The base of the cassette shown in perspective in FIG. 1 is shown in plan in FIG. 2 with a spool 5 inserted. The spool 5, formed according to the invention, has a number of recesses 6 corresponding to the number of projections 4 spaced around the edge of each flange, the depth of which recesses corresponds approximately to the thickness of the projections with the width thereof being about three times the width of the projections. The wider the recesses are, the easier it is to place the spool in the casette; on the other hand, however, the spool must be rotated through a greater angle in order to locate the projections between the spool flanges. Suitable dimensions should thus be selected according to the requirements demanded.

As can be seen in FIG. 2, the inner area of the spool is provided with two kidney-shaped aperatures 7, into which project similarly kidney-shaped but smaller protuberances 8 of the bottom wall 3 of the cassette. These protuberances 8 on the base wall 3 provide stops and in this way limit rotation of the spool in the cassette. The projections 4 can thus only be rotated between the spool flanges until the edges of the protuberances 8 come up against the edges of the apertures 7. In this way, a degree of retention of the spool in the cassette is achieved.

Figure 3:
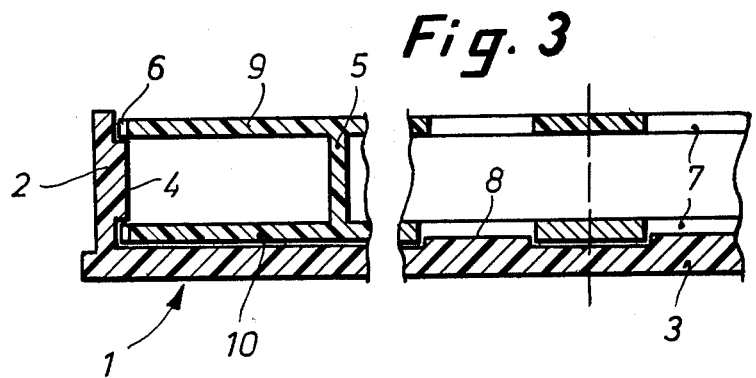
FIG. 3 shows a section along the line A—A of FIG. 2.

FIG. 3 shows a section along the line A—A in FIG. 2, the projections 4 as well as the protuberances 8 being identified. In the position of the spool 5 shown here, in which the projections 4 are within the recesses 6, the edges of the upper and lower spool flanges 9 and 10 extend up to the projections 4, whilst the edge lying outside the area of the recesses extends practically to the inner side of the side wall 2 of the cassette base 1. The aperatures 7 arranged in the upper 9 and lower 10 spool flanges serve to receive the protuberances 8 of the bottom wall 3 of the cassette.

FIG. 4 shows a view of a part of the underside of the upper flange 9 of a spool formed according to a second embodiment of the invention. This embodiment differs with respect to that shown in FIGS. 1 to 3 in that the height of the projections 4 of the side wall 2 is slightly greater than the spacing between the spool flanges 9 and 10 and that the inner sides of the spool flanges at the edge areas adjacent the recesses 6 are provided with guide grooves 11 matched to the thickness of the protruding areas; the ends of which guide grooves terminate in depressions 12 in which the projections 4 engage. In FIG. 4, the underside of the upper spool flange is shown. On rotating the spool, the projections 4 engage the guide grooves 11 and slide along into the depressions 12, with which they engage with a resilient snap action. This action results from the inside spacing of the spool flanges combined with the depth of the guide grooves 11 being slightly less than the height of the projections 4, so that a degree of pre-tensioning is obtained. It is clear that such a formation of the inner sides of the spool flanges can only be carried out on one side of one flange.

In the following FIGS. 5 through 9 are proposals according to the invention which differ basically from those in FIGS. 1 through 4. FIG. 5 is a perspective view of a part of a side wall of the base 20 of a cassette which includes an area whose height corresponds approximately to the inside spacing of the spool flanges and which is resiliently mounted in such manner as to be radially displaceable with respect to the remaining wall areas, so that it is pressed into the inside of the cassette between the spool flanges when the cassette lid is applied. This can be effected by providing, on the outer side of the displaceable wall area, a protruding area 22 which can be displaced radially inwardly from its original position by the side wall of the lid.

In the embodiment shown in FIG. 5, the displaceable wall area is formed as a strip 21 which is connected to the remaining wall areas by way of connection points 28 at either side, and has upper and lower edges 27 moveable in a radial direction with respect to the remaining wall areas.

FIG. 6 shows a section along the line B—B in FIG. 5. It can be seen that, with the lid removed, the displaceable wall area 21, with the protruding area 22 arranged on the outer side, is not pushed between the flanges 23 and 24 of the spool inserted in the cassette, but rather assumes its normal position within the side wall of the base 20. FIG. 7 shows the same section only this time with the lid 25 applied. The protruding area 22 and with it the displaceable wall area 21 of the side wall of the base 20 is pressed out of its normal position by the side wall 26 of the lid 25, into the inside of the cassette between the spool flanges 23, 24, so as to form a support for these. In order to enable the side wall 26 to slide over the protruding area 22, the latter is chamfered.

Further, in FIGS. 8 and 9, further embodiments of the invention are shown in which the resilient and displaceable areas of the side wall of the base are formed in the shape of tongues. FIG. 8 shows part of the side wall of the base 30 which is provided with a tongue 31 extending in a horizontal direction and at the moveable end portion of which a protruding area 32 is formed. The tongue 31 is connected to the side wall of the base 30 at 34, whilst its upper and lower edges 33 are freely moveable with respect to the remaining wall areas.

FIG. 9 shows part of the side wall of the base 40 whose resilient and displaceable wall areas are formed from two tongues 41 and 42 extending vertically in opposite directions with free ends on which protruding areas 43 are formed. The connection points of the tongues 41 and 42 with the remaining wall areas are indicated at 45 by dotted lines, whilst the remaining edges 44 are freely displaceable. It is clear that the vertical spacing between the free ends of the tongues approximates the spacing between the spool flanges.

Figure 10:
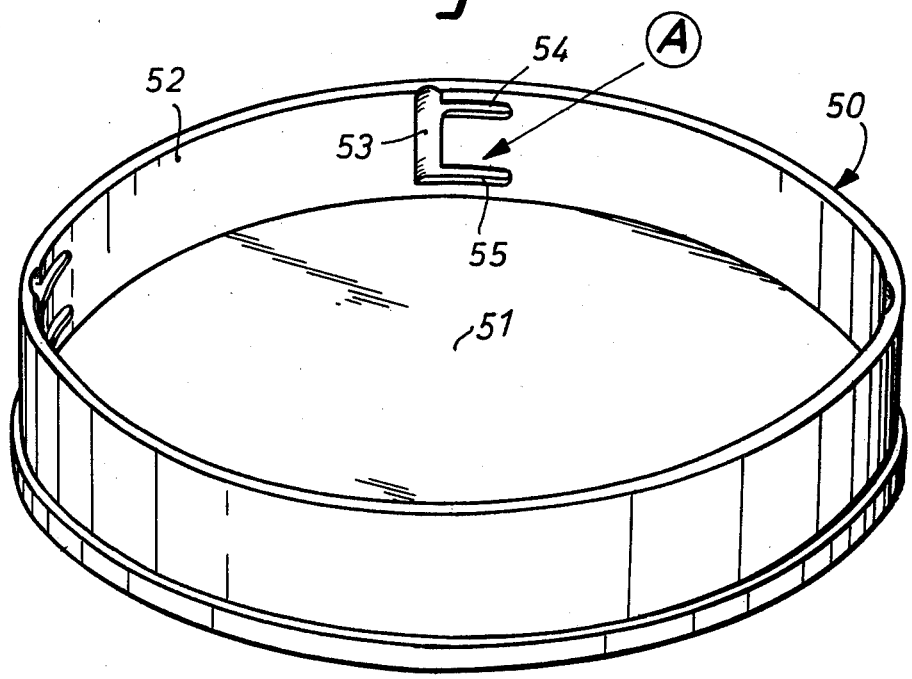
FIG. 10 shows a perspective view of the cassette base of a further embodiment.
Figure 11:
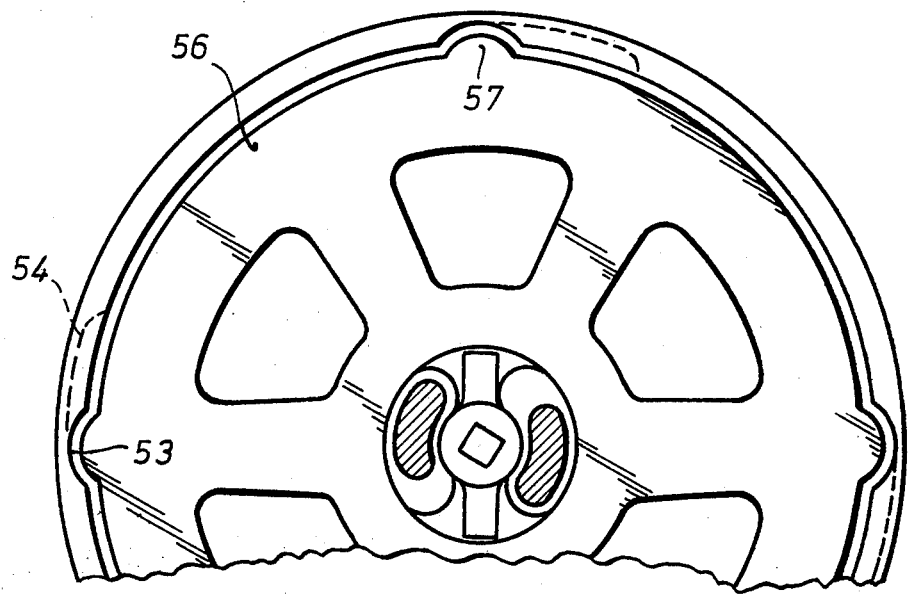
FIG. 11 is a plan view of the cassette base shown in FIG. 10 with a spool inserted.

A further preferred embodiment of the invention is shown in FIGS. 10 to 12. In FIG. 10, the base 50 of a cassette is shown, the side wall 52 of which is provided with recesses 53 on the inside, which recesses include vertical portions extending from adjacent the lower edge to the upper edge of the side wall. The recesses also include horizontal recess portions 54 and 55 arranged at the same spacing as the spool flanges and having the same vertical dimension. The horizontal recess portions are so arranged that, a spool is placed in the cassette on its bottom wall 51, the spacing of its spool flanges exactly meets the recess portions 54 and 55.

FIG. 11 is a plan view of the base shown in FIG. 10 with an inserted spool 56. It can be seen that the spool flanges are provided with a number of projections 57 corresponding to the number of recesses, the depth and width of these projections being matched to the depth and width of the vertical portions of the recesses. The spool 56 is so placed in the base 50 that the projections 57 of the spool flanges engage in the vertical portions of the recesses 53. Accordingly, by rotating the spool, the projections 57 are guided into the horizontal portions 54 and 55 and rotated as far as their ends. In this manner, the spool is retained within the cassette.

FIG. 12 shows a portion A of FIG. 10 in which the formation of the recesses on the side wall of the base can be seen more clearly. The spacing between the horizontal recesses 54 and 55 corresponds exactly to the spacing between the spool flanges. The lower horizontal recess 55 is arranged somewhat above the bottom wall 51, as the lower spool flange generally does not lie directly on the bottom wall.

It is obvious that the previously mentioned special features can also be utilized in the embodiment shown in FIGS. 10 to 12. For example, the horizontal recesses 54 and 55 can be slightly chamfered to facilitate the introduction of warped flanges. Also, the provision of further stopping means is conceivable as shown, for example, in the central area of the bottom wall as shown in FIG. 11.

The following FIGS. 13 to 17 are concerned with a further embodiment of the invention in which the projections of the side wall of the cassette base are formed as insertable elements. FIG. 13 shows a perspective view of the base 1 of a cassette, having a side wall 2 and a bottom wall 3. Around the inner side of the side wall 2 of the casette base, vertical recesses 14 are spaced, these recesses extending from the upper edge of the side wall to about flange height from the bottom wall. Projections 4 formed as insertable elements are provided for insertion into these vertical recesses 14. These elements are pushed into the recesses from above until they abut the lower ends of the recesses. This position corresponds exactly to the spacing between spool flanges of the spool placed in the cassette.

The described insertable elements have chamfered upper and lower sides 13, the chamfering being directed towards a side wall in order to facilitate the introduction of the projections between the flanges, even with warped upper and lower flanges. The insertable elements can be wedged in the recesses, adhered or fastened in other ways.

Furthermore, FIG. 13 shows a protuberance 8 formed as a separate element which can be inserted into apertures 15 in the bottom wall 3. Naturally, further modifications of the embodiment are also possible.

In FIG. 14 the insertable elements shown in FIG. 13 are shown in front and side view as well as in plan. FIG. 15 shows the front and side view as well as the plan of a modified embodiment of the insertable elements. With this embodiment, the actual projecting areas 4 are provided on the back of a cross-piece 16 whose thickness is greater than the depth of the recesses 14 and whose height corresponds to the height of the side wall of the base. Thus, if these elements are inserted in the recesses 14, the cross-piece 16 extends a short distance into the inside of the casette so that the projecting areas 4, provided with chamfered upper and lower sides 13, then extend in a lateral direction. This embodiment is suitable for spools of lesser diameter than the casette. After introducing the projections 4 between the spool flanges, the edges of the flanges abut the cross-pieces 16, so that even a spool with smaller diameter than the casette is firmly retained.

In FIGS. 16 and 17 a still further embodiment of the insertable element is shown in which, contrary to FIG. 15, the projection 4 is formed as an element which can be inserted into the cross-piece 18. The cross-piece 18 can be pushed into the recess 14 of the side wall of the base in the usual way and includes a groove 19 on its rear side into which a rib 17 at the rear of the projection 4 can be inserted.

The particular advantage of the embodiments shown in FIGS. 13 to 17 is that in the cassette base 1 provided with recesses 14 the entirety of the here described elements can be inserted so that a cassette formed in this manner can be used not only for spools with differing diameters, but also for normally formed spools without recesses.

I claim:

1. A cassette and associated spool for film, recording tape, and similar material and a means for supporting the outer areas of the spool flanges characterized in that areas (21,31, 41,42) of the side wall (20,30,40) of the base of the cassette corresponding in height substantially to the spacing between adjacent sides of the spool flanges (23,24) are arranged to be resiliently and radially displaceable in relation to the other wall areas and provided with projections (22,32,43) on their outer sides and including means responsive to the application of the cassette lid (25) to the base of the cassette so that said areas will be pressed into the inside of the cassette between the spool flanges.

2. A cassette according to claim 1, characterized in that the resilient and displaceable wall areas (21,31,41,42) have a lesser thickness than the remainder of the side wall (20,30,40) of the base.

3. A cassette according to claim 1 characterized in that the resilient and displaceable wall areas are formed by tongues cut in the side wall (30,40) of the base, at the moveable end portions of which tongues, said projections (32,43) are arranged.

4. A cassette according to claim 3, characterized in that said tongues (31) extend in a horizontal direction.

5. The cassette according to claim 3 characterized in that the resilient and displaceable wall areas are formed of two vertically directed extending tongues (14,42) with free ends.

* * * * *